June 13, 1933. W. MICHALSKI 1,914,274
AUTOMOBILE IGNITION LOCK MECHANISM
Filed April 8, 1932 3 Sheets-Sheet 1

Inventor
Walter Michalski.
By Bryant & Lowry
Attorneys

Inventor
Walter Michalski
By Bryant & Lowry
Attorneys

June 13, 1933.   W. MICHALSKI   1,914,274
AUTOMOBILE IGNITION LOCK MECHANISM
Filed April 8, 1932    3 Sheets-Sheet 3
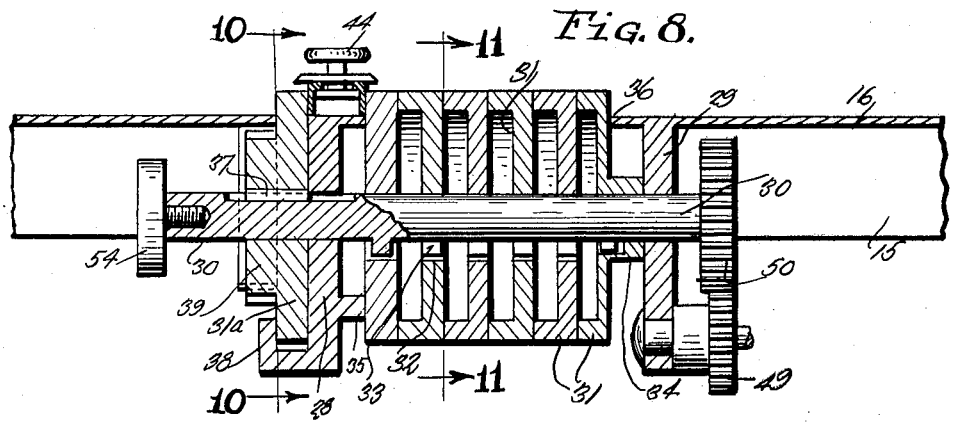
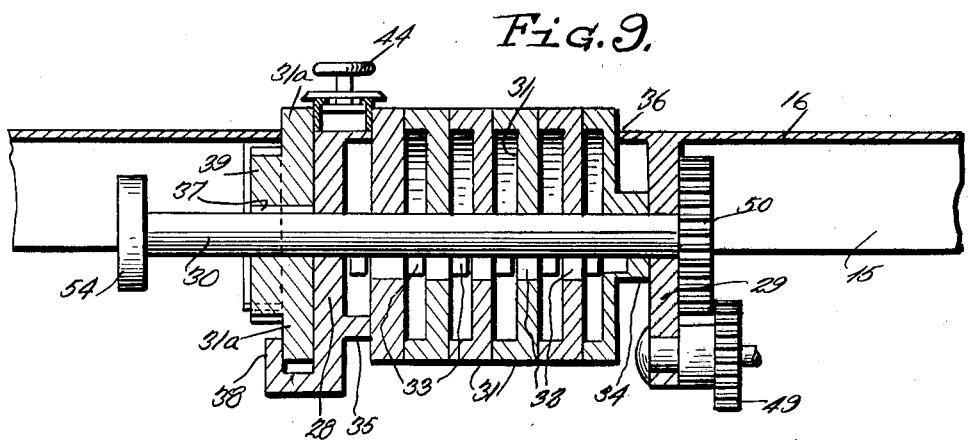
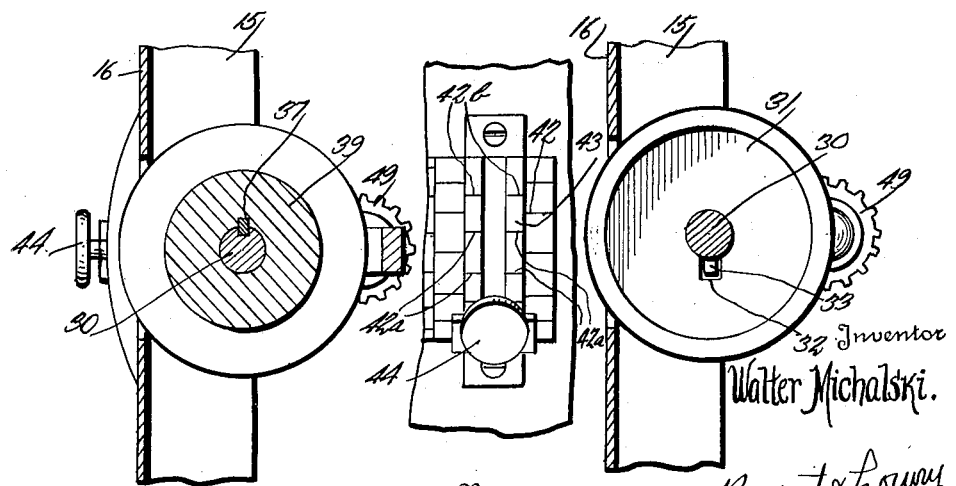
Inventor
Walter Michalski.
By Bryant & Lowry
Attorneys Patented June 13, 1933

1,914,274

UNITED STATES PATENT OFFICE

WALTER MICHALSKI, OF BROOKLYN, NEW YORK

AUTOMOBILE IGNITION LOCK MECHANISM

Application filed April 8, 1932. Serial No. 604,057.

This invention relates to certain new and useful improvements in automobile ignition lock mechanism.

The primary object of the invention is to provide ignition lock mechanism for an automobile wherein the lock mechanism is of a permutation character embodying a plurality of rotatable tumblers associated with a rotatable and longitudinally shiftable spindle to effect operation of the ignition circuit for the motor of the automobile.

With the above and other objects in view that will become apparent as the nature of the invention is better understood, the same consists in the novel form, combination and arrangement of parts hereinafter more fully described, shown in the accompanying drawings and claimed.

In the drawings:—

Figure 2 is a fragmentary rear elevational view of the instrument board with the cover for the lock casing removed and illustrating the ignition lock operating mechanism in inoperative position with the different groups of circuit wires associated with the motor, lights, horn and the like;

Figure 8 is a detail sectional view taken on line 8—8 of Figure 3, showing the ignition lock or switch operating mechanism in its operative position;

Figure 9 is a detail sectional view similar to Figure 8, showing the ignition lock or switch operating mechanism in its inoperative position;

Figure 10 is a cross-sectional view taken on line 10—10 of Figure 8, showing the tumbler splined upon the lock spindle for rotating the spindle;

Figure 11 is a cross-sectional view taken on line 11—11 of Figure 8, showing one of the rotatable tumblers; and Figure 12 is a fragmentary elevational view of a guide rack associated with the permutation lock mechanism.

Figure 4:
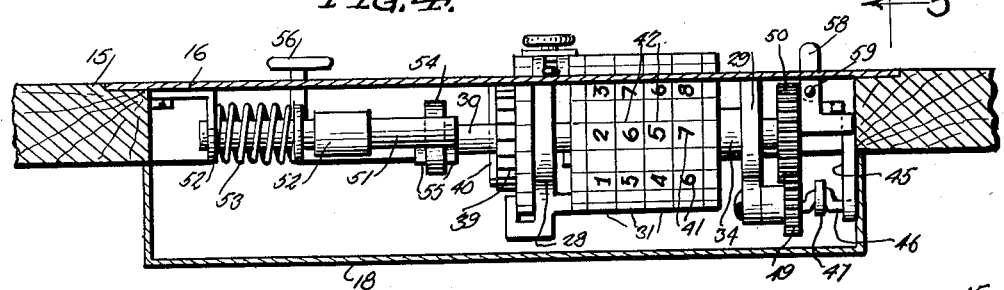
Figure 4 is a horizontal sectional view taken on line 4—4 of Figure 3, showing the ignition lock operating mechanism in its operative position.
Figure 5:
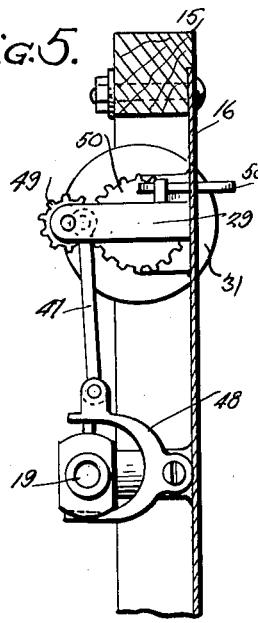
Figure 5 is a cross-sectional view taken on line 5—5 of Figure 3, showing the crank arm and link connection between the ignition lock or switch and operating mechanism therefor.

Briefly described the invention relates to permutation lock mechanism for controlling the operation of the ignition lock or switch of a motor vehicle, a mechanism casing being supported on the instrument board of an automobile and having an opening therein through which the rotatable tumblers of the lock device extend and the face plate of said mechanism casing carries the push buttons or similar devices for operating different switches for controlling the operation of the automobile signal or horn, turn and stop lights, parking light, running lights, a theft indicating signal as well as other appurtenances incident to the operation of the automobile. Referring more in detail to the accompanying drawings, the reference numeral 15 designates the instrument board of the automobile having a relatively large opening therein into which is set mechanism casing comprising a face plate 16 secured as at 17 to the instrument board 15 at the outer side thereof, the rear side of the mechanism casing comprising a removable cover 18 as shown in Figure 4.

Figure 1:
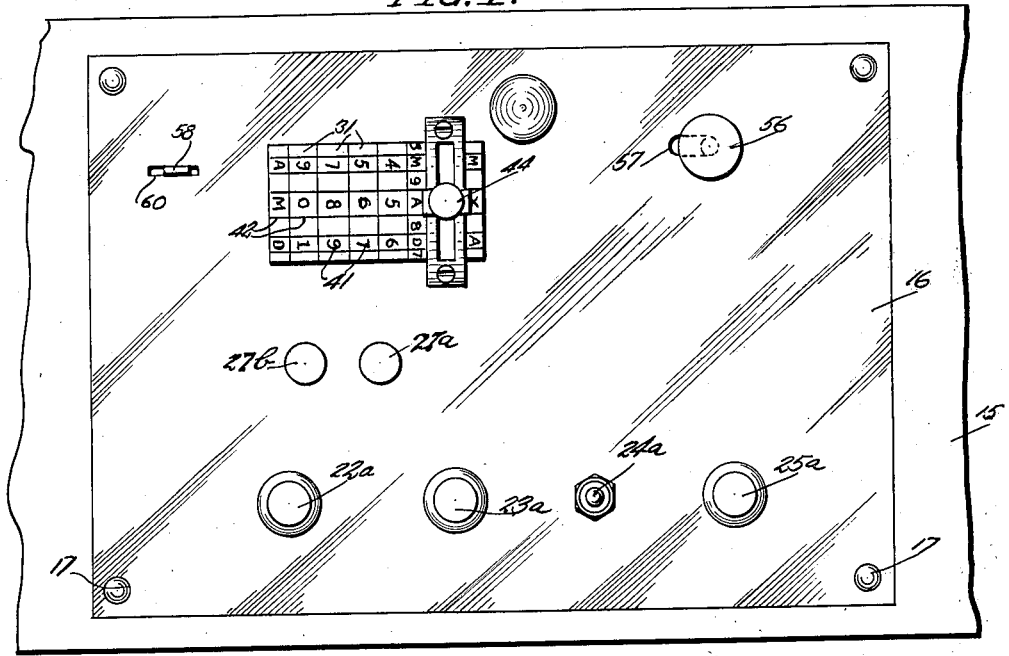
Figure 1 is a fragmentary front elevational view of the instrument board of an automobile showing the face plate of the lock mechanism set into the instrument board with the rotatable tumblers of the lock device extending through an opening in the face plate to facilitate operation thereof.
Figure 2:
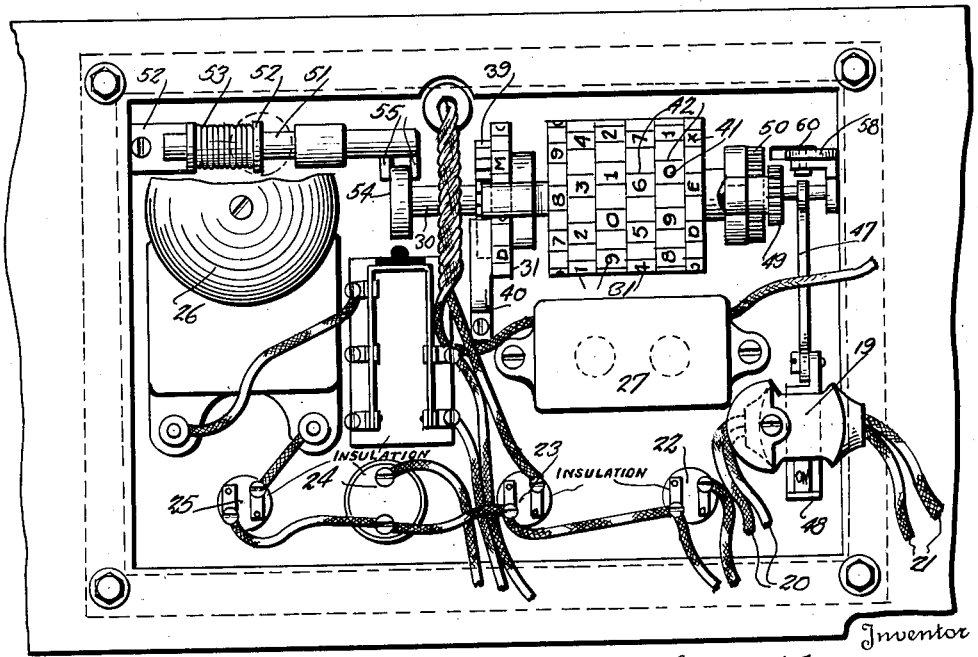
Figure 3:
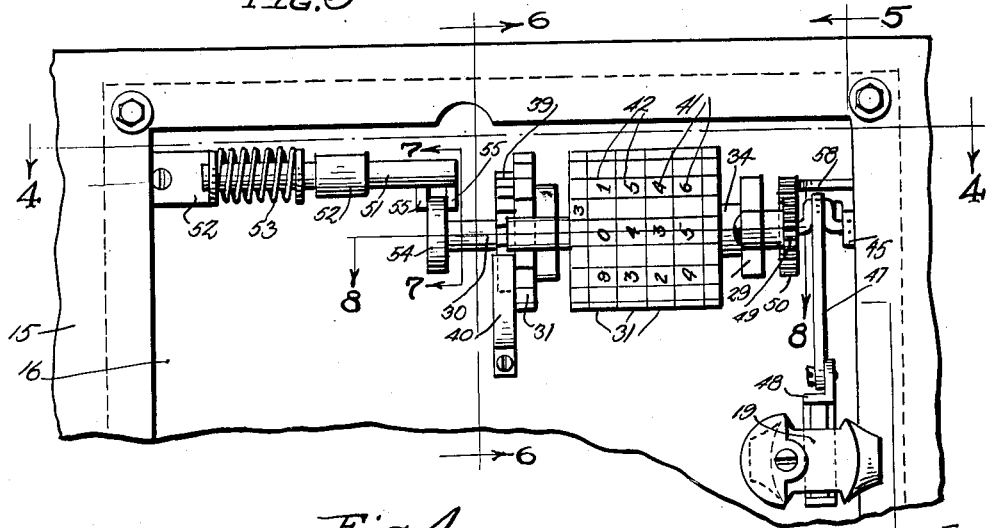
Figure 3 is a fragmentary rear elevational view, similar to Figure 1, with the circuit wires eliminated for the better illustration of the ignition lock operating mechanism, the latter being illustrated in its operative position.

The ignition lock or switch 19 is mounted upon the inner side of the face plate 16 as shown in Figures 2 and 3, and has wires 20 connecting the same to a source of potential such as a battery and other wires 21 leading to the motor of the automobile. As the gist of this invention primarily resides in the permutation lock mechanism for controlling operation of the ignition switch 19, the electrical features will only be briefly described, the switch 22 operated by the push button 22a controlling the horn, the switch 23 operated by the push button 23a operating direction and stop signals, the switch 24 operated by the push pin 24a operating the parking and dash lamps, while the switch 25 operated by the push button 25a is in circuit with the alarm or bell 26 that is operated when a person unfamiliar with the wiring arrangement attempts to operate or start the automobile by pushing the button 25a. A switch box 27 in circuit with the usual head and tail lights of the automobile is controlled by "on" and "off" buttons 27a and 27b respectively, all of said buttons and electrical control devices being operable from the exposed side of the face plate 16 of the mechanism casing. As the wiring arrangement illustrated in Figure 2 does not enter into the merits of the present invention, detailed reference thereto will be omitted.

The operating mechanism for the ignition switch 19 includes a permutation lock device supported on the inner face of the plate 16, the support comprising a pair of spaced bracket arms 28 and 29, in which a tumbler shaft 30 is rotatably and slidably mounted. A series of rotating tumblers 31 of the form best illustrated in Figures 8 and 9 is mounted upon the shaft 30, the bearing openings in said tumblers 31 being notched as at 32 to receive tumbler lugs 33 radially carried by the shaft 30. The rotating tumblers are maintained in position upon the shaft 30 by means of an end boss or nut 34 interposed between the bracket arm 29 and adjacent tumbler and the flange 35 interposed between the bracket arm 28 and the adjacent tumbler. As illustrated, the peripheral edges of the rotating tumblers project through an opening 36 in the face plate 16 of the mechanism casing and said tumblers are operable from the outer side of the casing for aligning the several notches 32 thereof, the shaft 30 being rotatable to align its tumblers 33 with said notches, whereupon the shaft 30 may be slid axially to position the tumbler lugs in the tumbler notches for locking the shaft 30 to the rotating tumblers so that the latter can rotate as a unit.

Figure 6:
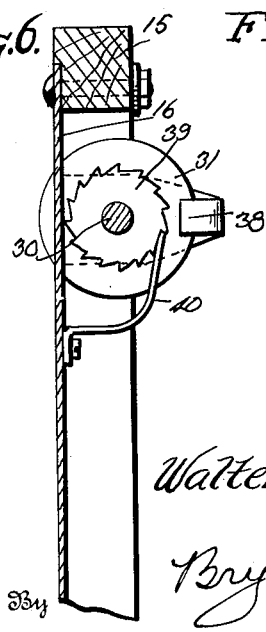
Figure 6 is a cross-sectional view taken on line 6—6 of Figure 3, showing the pawl and ratchet devices permitting rotation of the lock spindle in one direction only.
Figure 7:
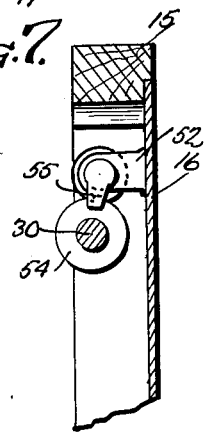
Figure 7 is a detail sectional view taken on line 7—7 of Figure 3, showing the connection between the permutation lock spindle and the tensioned operating device therefor.

The shaft rotating means comprises a rotatable tumbler disk 31a through which the shaft 30 is splined as at 37 and said tumbler disk 31a is restrained from longitudinal movement upon the shaft by the angle arm extension 38 carried by the bracket arm 28 and engaged therewith, the tumbler disk 31a being disposed between the bracket arm 28 and angle lug 38 with the side of the bracket arm opposite the tumblers 31. A ratchet wheel 39 facially projects from the tumbler disk 31a and forms an integral part thereof and as shown in Figure 6, the ratchet wheel 39 is engaged by a spring pawl 40 permitting rotation in one direction only of the shaft 30 in the tumbler disks 31 when the latter are interlockingly engaged with the shaft. The peripheral edges of the tumbler disks 31 and 31a carry permutation characters, such as letters and numerals, the tumbler disks 31 being rotatable upon the shaft 30 in either direction to align certain letters and numerals for placing the tumbler notches 32 in alignment, the tumbler disk 31a being then rotated in one direction only permitted by the pawl and ratchet mechanism associated therewith for the rotation of the shaft 30 to align the tumbler lugs carried thereby with the tumbler notches 32. The permutation characters upon the peripheral edges of the tumbler disks are designated by the reference character 41 and each permutation character is spaced by a cross line 42, the lines 42 upon the permutation tumblers to be aligned with the lines 42a formed on a guide bracket overlying the opening 36 in the face plate 16 between the tumblers 31 and 31a at opposite sides of the bracket arms 28 as shown in Figures 8, 9 and 12. The lines 42b upon the guide bracket 43 and the slide button 44 carried by the guide bracket 43 are for the purpose of causing confusion in the operation of the permutation lock mechanism by persons unfamiliar therewith or by other unauthorized persons endeavoring to start the motor of the automobile, the slide button 44 creating the impression that movement thereof relative to the line indications 42a and 42b is required to the successful operation of the lock mechanism, and thereby rendering the operation of the permutation lock more difficult to persons unfamiliar therewith.

Devices are provided for automatically shifting the shaft 30 longitudinally of the tumbler disk when the tumbler lugs are aligned with the tumbler notches for locking the tumblers to the shaft and also for establishing communication between the shaft which is then operated by the tumblers as a unit and the ignition switch 19, the latter devices including a bracket arm 45 projecting from the face plate 16 parallel with and in spaced relation to the bracket arm 29, the bracket arms 29 and 45 having a crank shaft 46 journalled therein that has a link rod connection 47 with a movable arm 48 of the ignition switch 19, one bearing end of the shaft 46 having a pinion 49 fixed thereon. The end of the permutation lock shaft 30 that projects through the bracket arm 29 carries a gear wheel 50 that is adapted to be meshingly engaged with the pinion 49 upon automatic axial projection of the shaft 30 to assume the position illustrated in Figure 4.

The devices to effect automatic projection of the lock shaft 30 include a rod 51 slidably mounted in bearings 52 and having a coil spring 53 associated therewith in a manner to cause projection of the rod 41 toward the permutation lock mechanism. The end of the shaft 30 that projects through the bracket arm 28 carries a disk head 54 that is straddled by a fork 55 projecting laterally of the adjacent end of the rod 51 and it will therefore be seen that when the tumblers 31 and 31a have been operated to align the shaft lugs 53 with the tumbler notches 32, the spring 53 projects the rod 51 and shaft 30 to cause the gear wheel 50 carried by the shaft 30 to mesh with the pinion 49 upon the crank shaft 46. In the event of any binding action tending to resist operation of the rod 51 and shaft 30, or for failure of the spring 53 to operate, the rod 51 has a finger button operator 56 extending through a slotted opening 57 in the face plate 16, by which the rod and shaft may be manually shifted. To restore the permutation tumblers 31 and 31a together with the shaft 30 to inoperative positions, the angle lever 58 pivoted within the mechanism casing as at 59 has one end thereof projecting through the slotted opening 60 in the face plate with its inner end engaged with the gear wheel 50 at the outer side thereof for shifting the shaft 30 and the rod 41 against the tension of the spring 53 to disengage the shaft lugs 33 from the tumbler notches 32, whereupon the tumbler disks may be rotated to displace the notches from alignment with the shaft lugs, it being then again required to operate the permutation lock mechanism to effect operation of the ignition switch 19.

From the above detailed description of the invention, it is believed that the construction and operation thereof will at once be apparent, it being noted that after the several tumbler disks 31 have been rotated in the desired direction to properly align the permutation indicia 41 and the lines 42 associated therewith with respect to the lines 42a upon the guide bracket 43, the tumbler disk 31a is then operated for rotating the shaft 30 to align the tumbler lugs 33 with the notches 32 and at which time the spring 53 upon the rod 51 automatically projects the rod and shaft 30 into lockingly engaged position therewith for moving the gear wheel 50 into meshing engagement with the pinion 49. With the parts so disposed, the several rotatable tumbler disks 31 are then keyed to the shaft 30 and said tumbler disks and shafts rotate as a unit in one direction, occasioned by the pawl and ratchet mechanism associated with the shaft. The rotation of the shaft operates the pinion 49 for driving the crank shaft 46 and link rod 47 attached thereto for the operation of the pivoted arm associated with the ignition switch 19. It will therefore be seen that the ignition switch may be turned to "on" and "off" positions by the tumbler disks operating the shaft 30 and when it is desired to prevent operation of the ignition switch 19, the lever 58 is operated to shift the shaft 30 longitudinally to displace the shaft lugs 33 from the tumbler notches 32, whereupon the several disk tumblers 31 are rotated to displace the tumbler notches relative to the shaft lugs. As previously stated, the slide button 44 associated with the guide bracket does not enter into the operation of the lock mechanism but is intended only for the purpose of causing confusion to unauthorized persons who attempt to start the motor of the automobile.

While there is herein shown and described the preferred embodiment of the invention, it is nevertheless to be understood that minor changes may be made therein without departing from the spirit and scope of the invention as claimed.

I claim:—

1. Operating means for automobile ignition switches comprising in combination with an ignition switch including a switch lever, permutation lock mechanism including rotatable tumblers and a cooperating rotatable and axially shiftable shaft extending through the tumblers, means associated with one end of the shaft for automatically axially shifting the shaft when the rotatable tumblers and shaft are cooperatively related and separable operative connections between the other end of the shaft and ignition switch lever rendered operable upon axial projection of the shaft and including meshing gears and an eccentric rod connection between the gears and ignition switch lever.

2. Operating means for automobile ignition switches comprising in combination with an ignition switch including a switch lever, permutation lock mechanism including rotatable tumblers and a cooperating rotatable and axially shiftable shaft extending through the tumblers, means associated with one end of the shaft for automatically axially shifting the shaft when the rotatable tumblers and shaft are cooperatively related and separable operative connections between the other end of the shaft and ignition switch lever rendered operable upon axial projection of the shaft, and manually operable means for axially shifting the shaft in the opposite direction to separate the ignition switch operating means and rotating the tumblers to hold the shaft and including meshing gears and an eccentric rod connection between the gears and ignition switch lever retracted.

3. Operating means for automobile ignition switches comprising in combination with an ignition switch including a switch lever, permutation lock mechanism including rotatable tumblers and a cooperating rotatable and axially shiftable shaft extending through the tumblers, means associated with one end of the shaft for automatically axially shifting the shaft when the rotatable tumblers and shaft are cooperatively related and separable operative connections between the other end of the shaft and ignition switch lever rendered operable upon axial projection of the shaft and including meshing gears and an eccentric rod connection between the gears and ignition switch lever, and means associated with the shaft projection means for manual operation of the shaft.

4. Operating means for automobile ignition switches comprising in combination with an ignition switch including a switch lever, permutation lock mechanism including rotatable tumblers and a cooperating rotatable and axially shiftable shaft extending through the tumblers, means associated with one end of the shaft for automatically axially shifting the shaft when the rotatable tumblers and shaft are cooperatively related and separable operative connections between the other end of the shaft and ignition switch lever rendered operable upon axial projection of the shaft and including meshing gears and an eccentric rod connection between the gears and ignition switch lever, manually operable means for axially shifting the shaft in the opposite direction to separate the ignition switch operating means and rotating the tumblers to hold the shaft retracted, and means associated with the shaft projection means for manual operation of the shaft.

5. Permutation lock mechanism for operating an ignition switch comprising in combination with an ignition switch including a switch lever, a shaft journalled for axial movement, tumbler lugs carried radially of the shaft, a series of rotating tumblers on the shaft having bearing notches to be alined with each other and an operating rotating tumbler through which the shaft is splined for rotating the shaft to aline the tumbler lugs with the tumbler bearing notches, means for automatically axially shifting the shaft when the lugs and notches are alined, devices interposed between the shaft and ignition switch rendered operable upon axial shifting movement of the shaft, including meshing gears in communication with the shaft and a crank arm and link connection between the gears and ignition switch.

6. Permutation lock mechanism for operating an ignition switch comprising in combination with an ignition switch including a switch lever, a shaft journalled for axial movement, tumbler lugs carried radially of the shaft, a series of rotating tumblers on the shaft having bearing notches to be alined with each other and an operating rotating tumbler through which the shaft is splined for rotating the shaft to aline the tumbler lugs with the tumbler bearing notches, means for automatically axially shifting the shaft when the lugs and notches are alined, and devices interposed between the shaft and ignition switch rendered operable upon axial shifting movement of the shaft, including a gear on one end of the shaft, a journalled crank shaft, a pinion on the crank with which the gear is adapted to mesh and a link rod connection between the crank shaft and ignition switch.

7. Permutation lock mechanism for operating an ignition switch comprising in combination with an ignition switch including a switch lever, a shaft journalled for axial movement, tumbler lugs carried radially of the shaft, a series of rotating tumblers on the shaft having bearing notches to be alined with each other and an operating rotating tumbler through which the shaft is splined for rotating the shaft to aline the tumbler lugs with the tumbler bearing notches, means for automatically axially shifting the shaft when the lugs and notches are alined, devices interposed between the shaft and ignition switch rendered operable upon axial shifting movement of the shaft, including meshing gears in communication with the shaft and a crank arm and link connection between the gears and ignition switch, a casing inclosing the operating mechanism and ignition switch set into an opening in the instrument board of an automobile with a wall of the casing closing the opening, said wall having an opening therein through which the rotatable tumblers and operating tumbler project and a guide bracket associated with the casing wall and tumblers for aligning the combination indicia of the tumblers.

8. Permutation lock mechanism for operating an ignition switch comprising in combination with an ignition switch including a switch lever, a shaft journalled for axial movement, tumbler lugs carried radially of the shaft, a series of rotating tumblers on the shaft having bearing notches to be alined with each other and an operating rotating tumbler through which the shaft is splined for rotating the shaft to aline the tumbler lugs with the tumbler bearing notches, pawl and ratchet mechanism associated with the single tumbler to permit rotation of the shaft and notched tumblers as a unit in one direction, a casing inclosing the operating mechanism and ignition switch set into an opening in the instrument board of an automobile with a wall of the casing closing the opening, said wall having an opening therein through which the rotatable tumblers and operating tumbler project and a guide bracket associated with the casing wall and tumblers for aligning the combination indicia of the tumblers.

9. Permutation lock mechanism for operating an ignition switch comprising in combination with an ignition switch including a switch lever, a shaft journalled for axial movement, tumbler lugs carried radially of the shaft, a series of rotating tumblers on the shaft having bearing notches to be alined with each other and an operating rotating tumbler through which the shaft is splined for rotating the shaft to aline the tumbler lugs with the tumbler bearing notches, means for automatically axially shifting the shaft when the lugs and notches are alined, devices interposed between the shaft and ignition switch rendered operable upon axial shifting movement of the shaft, including a gear on one end of the shaft, a journalled crank shaft, a pinion on the crank with which the gear is adapted to mesh and a link rod connection between the crank shaft and ignition switch, a casing inclosing the operating mechanism and ignition switch set into an opening in the instrument board of an automobile with a wall of the casing closing the opening, said wall having an opening therein through which the rotatable tumblers and operating tumbler project and a guide bracket associated with the casing wall and tumblers for aligning the combination indicia of the tumblers.

10. Operating means for automobile ignition switches comprising in combination with an ignition switch including a switch lever, permutation lock mechanism including rotatable tumblers and a cooperating rotatable and axially shiftable shaft extending through the tumblers, means associated with one end of the shaft for automatically axially shifting the shaft when the rotatable tumblers and shaft are cooperatively related and sepable operative connections between the other end of the shaft and ignition switch rendered operable upon axial projection of the shaft and including meshing gears and an eccentric rod connection between the gears and ignition switch lever, the means for axially shifting the shaft including a tensioned rod, a disk head on one end of the shaft and a fork connection between the rod and disk head.

11. Operating means for automobile ignition switches comprising in combination with an ignition switch including a switch lever, permutation lock mechanism including rotatable tumblers and a cooperating rotatable and axially shiftable shaft extending through the tumblers, means associated with one end of the shaft for automatically axially shifting the shaft when the rotatable tumblers and shaft are cooperatively related and separable operative connections between the other end of the shaft and ignition switch rendered operable upon axial projection of the shaft and including meshing gears and an eccentric rod connection between the gears and ignition switch lever, the means for axially shifting the shaft including a tensioned rod, a disk head on one end of the shaft and a fork connection between the rod and disk head, and a button carried by the rod whereby the latter may be manually operated.

In testimony whereof I affix my signature.

WALTER MICHALSKI.